US012447410B2

(12) United States Patent
Uberti et al.

(10) Patent No.: US 12,447,410 B2
(45) Date of Patent: Oct. 21, 2025

(54) AUDIO SYSTEM AND METHOD

(71) Applicant: Sony Interactive Entertainment Inc., Tokyo (JP)

(72) Inventors: David Erwan Damien Uberti, London (GB); Andy Walker, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 297 days.

(21) Appl. No.: 18/191,406

(22) Filed: Mar. 28, 2023

(65) Prior Publication Data

US 2023/0310993 A1 Oct. 5, 2023

(30) Foreign Application Priority Data

Mar. 31, 2022 (GB) ..................................... 2204721

(51) Int. Cl.
*A63F 13/79* (2014.01)
*A63F 13/54* (2014.01)
*A63F 13/60* (2014.01)
*A63F 13/847* (2014.01)

(52) U.S. Cl.
CPC .............. *A63F 13/79* (2014.09); *A63F 13/54* (2014.09); *A63F 13/60* (2014.09); *A63F 13/847* (2014.09)

(58) Field of Classification Search
None
See application file for complete search history.

(56) References Cited

U.S. PATENT DOCUMENTS

2009/0198789 A1* 8/2009 Young ..................... A63F 13/45 709/213
2012/0117587 A1 5/2012 Pedlow
2012/0122577 A1* 5/2012 Aronzon ................. A63F 13/25 463/36
2020/0194000 A1* 6/2020 Xian ....................... G10L 15/30
2021/0217407 A1* 7/2021 Mohapatra ............ G10L 15/063
2021/0406481 A1* 12/2021 Spence ................. G06F 40/263

FOREIGN PATENT DOCUMENTS

CN 108595020 A 9/2018
CN 111841006 A 10/2020

OTHER PUBLICATIONS

Combined Search and Examination Report for corresponding GB Application No. 2204721.1, 6 pages, dated Sep. 26, 2022.
Extended European Search Report for corresponding EP Application No. 23163084.9, 6 pages, dated Aug. 30, 2023.

* cited by examiner

*Primary Examiner* — Jason T Yen
(74) *Attorney, Agent, or Firm* — Kilpatrick Townsend & Stockton LLP

(57) ABSTRACT

A method of audio provision includes executing a game in a local co-operative play mode, outputting for the game first audio in a preferred language of a first user, and also outputting for the game second audio in a different preferred language of a second user.

13 Claims, 4 Drawing Sheets

AUDIO SYSTEM AND METHOD

BACKGROUND OF THE INVENTION

Field of the Invention

The present invention relates to an audio system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventionally, multiplayer games take one of two forms. In the first form, separate users with respective games machines join an game hosted online (for example by a server) to play together. In this case, each user's respective games machine has their own copy of the game, and their respective copy will be configured for the nationality of the user (for example in terms of language used within the game).

In the second form, a group of users all play a single game together on a single games machine, for example by using a plurality of handheld controllers, and all the users are in the same room and typically friends. In this circumstance, the language of the game is not a consideration as it can be assumed that all the users in the group can share the same language as the person whose games machine it is.

However, there is scope for additional forms of multiplayer game, where issues of language may again need to be accommodated.

SUMMARY OF THE INVENTION

Various aspects and features of the present invention are defined in the appended claims and within the text of the accompanying description.

In a first aspect, a method of audio provision is provided in accordance with claim 1.

In another aspect, an audio provision system is provided in accordance with claim 11.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An audio system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
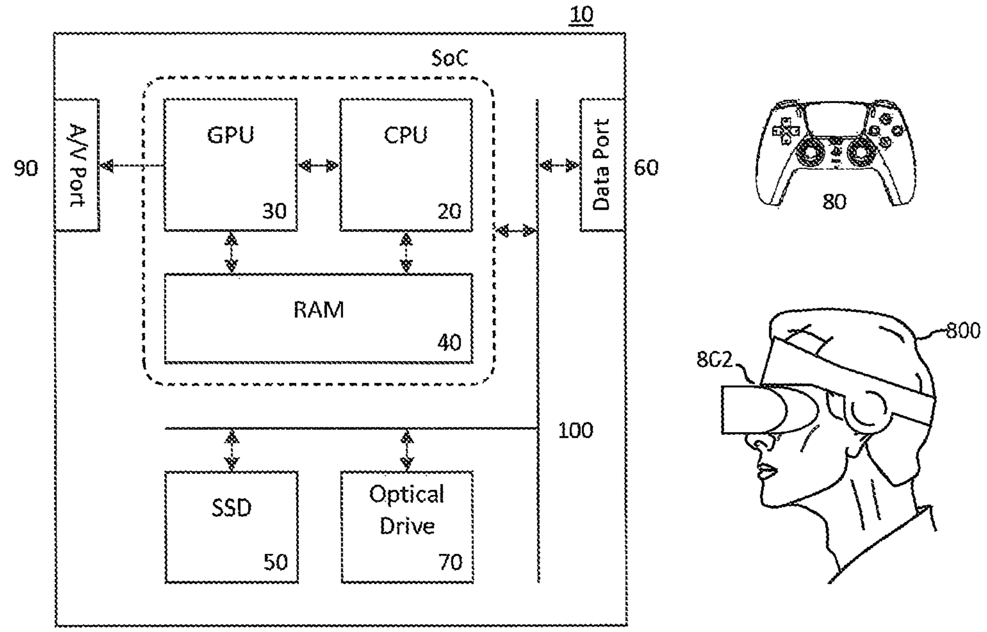
FIG. 1 is a schematic diagram of an entertainment device operable as an audio provision system in accordance with embodiments of the present description.

Referring now to the drawings, wherein like reference numerals designate identical or corresponding parts throughout the several views, FIG. 1 shows an example of an entertainment system 10 in the form of a computer or console such as the Sony® PlayStation 5 ® (PS5). The entertainment system (either as a home videogame console, a development console, a rack-mounted server console, or a virtualised console) is an example of the audio system described herein.

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip 'SoC' as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

Figure 2A:
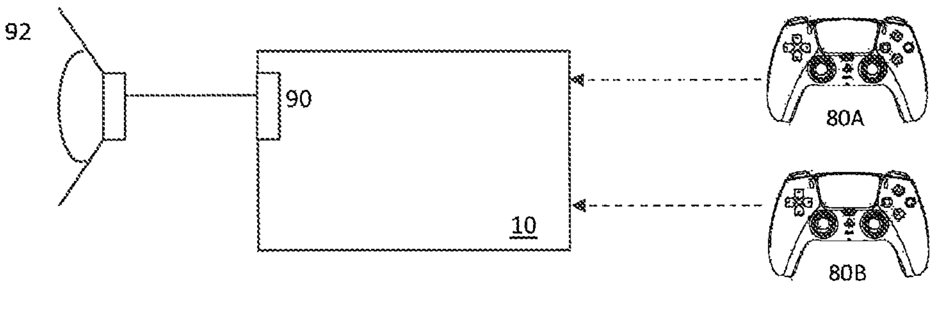
FIG. 2A is a respective configuration of an entertainment device.

Turning now to FIG. 2A, this illustrates a typical local co-op game where two or more players (indicated by controllers 80A and 80B) interact with the same entertainment device 10. In this case, audio from the game in a default language is output from the AV port 90 (or alternatively the data port 60) to a speaker 92.

Figure 2B:
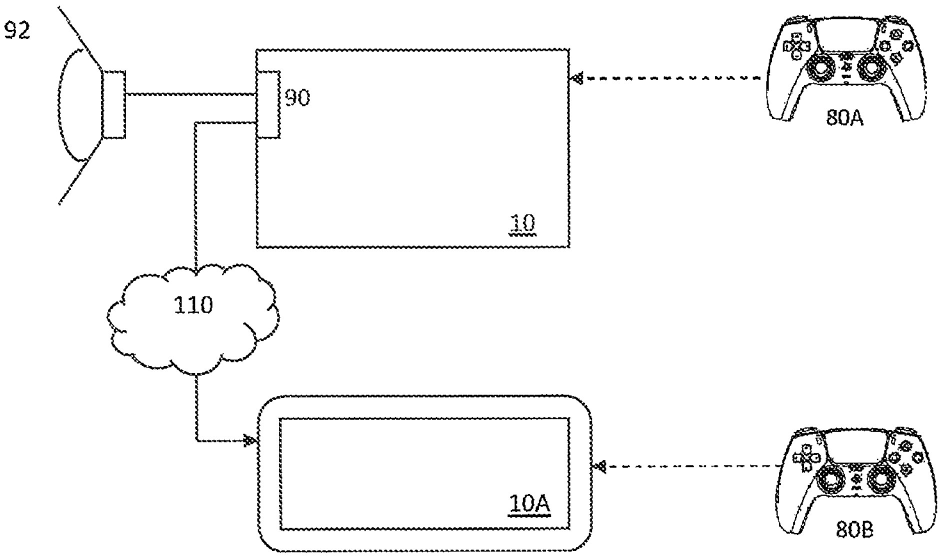
FIGS. 2B-2C are respective configurations of an entertainment device in accordance with embodiments of the present description.

Turning now to FIG. 2B, in another configuration comprising so-called 'remote play', the entertainment device 10 outputs audio from the game in a default language as before to the speaker 92, but also sends audio (and typically video) to a separate device 10A such as a mobile phone or portable videogame console, typically via a local area network or potentially the Internet 110. In some use cases, the output from the entertainment device and as shown on the separate device are the same, simply to enable a single user to continue playing a game away from the entertainment device, but optionally the output may be different to enable a local co-op game where one player is potentially remote from the other.

Figure 2C:
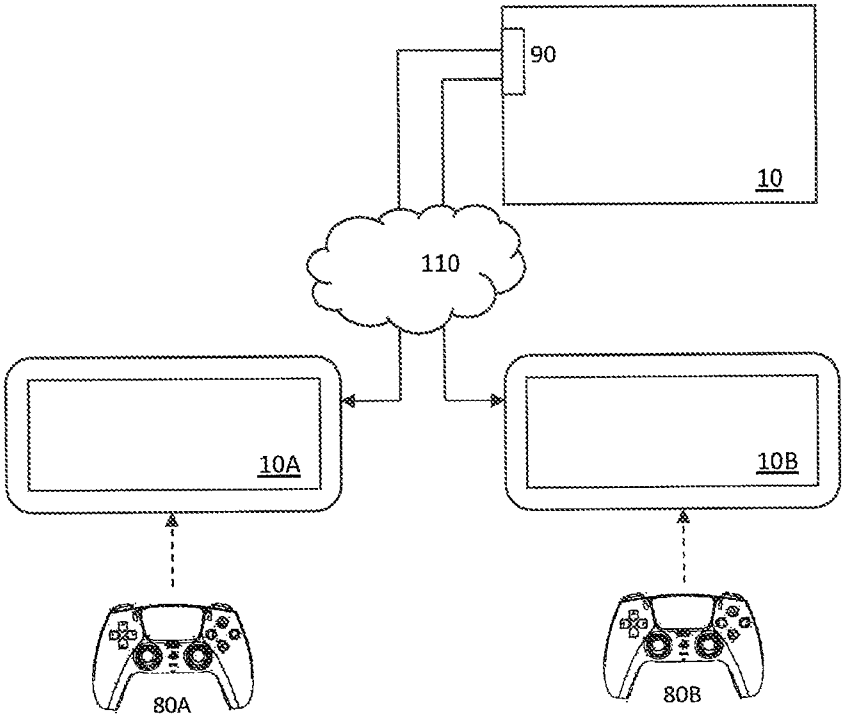

Turning next to FIG. 2C, in yet another configuration entertainment device 10 is incorporated into a server, either as hardware or a virtual machine. In this case effectively the output of the device is streamed to both separate players on respective devices 10A and 10B, and like the scenario of FIG. 2B, the players may be geographically separate.

Consequently a local co-op game designed for the scenario shown in FIG. 2A, which outputs audio in a default language, is not necessarily suited to use in the scenario is shown in FIGS. 2B and 2C, in which the users may potentially be located in different countries and have different native/preferred languages.

To address this problem, in embodiments of the present invention, audio for different languages is provided for a single executing instance of the video game. It will be appreciated that this is in contrast to conventional multiplayer games where each user has their own instance of the game which may be configured to output the respective language of its user.

Figure 3A:
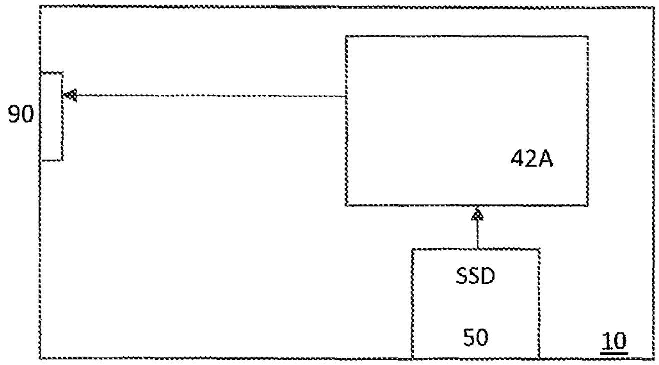
FIG. 3A is a respective configuration of an entertainment device executing a game.

Turning to FIG. 3A, this illustrates a conventional local co-op game 42A running within entertainment device 10. As the game executes, it requests audio files as needed for a particular language from storage device SSD 50 (or any other suitable data source including optical drive, hard drive, USB drive, or network), and outputs the resulting audio to AV port 90 (or data port 60 depending on the nature of the required communication with a desired speaker system).

As such conventional local co-op game 42A may be used in the scenario shown in FIG. 2A, but only in the scenario as shown in FIGS. 2B and 2C if geographically separate users share the same language.

Figure 3B:
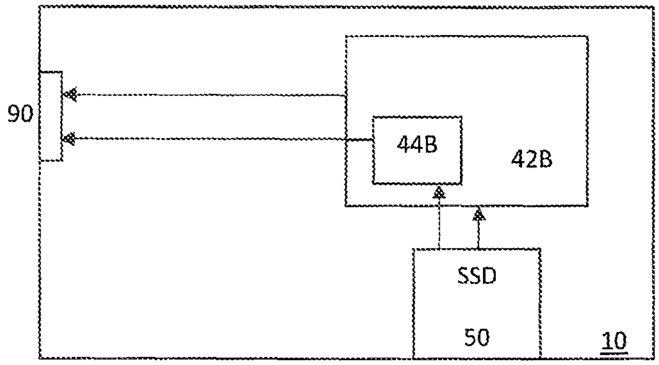
FIGS. 3B-3C are respective configurations of an entertainment device executing a game, in accordance with embodiments of the present description.

Accordingly, turning to FIG. 3B, in an embodiment of the present invention, a local co-op game 42B is modified to comprise helper function 44B, which causes the game as it executes to request audio files as needed for two particular languages from storage device SSD 50 or similar, and outputs the resulting audio in parallel to AV port 90 (or data port 60 depending on the nature of the required communication with a desired speaker system).

The helper function can either modify the game to explicitly request audio files in two languages, or can intercept or tap a single request for an audio file in a single language, and then duplicate that request for the corresponding audio file in the other preferred language.

In this case, the respective parallel outputs are sent to the respective end-users, either based on physical routing (e.g. by choice of audio channel) or logical routing (e.g. the use of addresses in data packets, or meta data indicating which user should be the recipient of the audio).

In this case, the preferred language of each player may be based on profile information associated with respective user logins and accounts.

In the scenario shown in FIG. 2B, the preferred language information for the user of the host device 10 may already be known, whilst the preferred language information for the user of the separate remote device 10A may either be provided to the host device directly from the separate remote device 10A, or may be provided by or via a separate server administering login processes and/or optionally administering routing between host device 10 and the separate device 10A.

Meanwhile in the scenario shown in FIG. 2C, the host device is typically not owned by either player, and so the preferred language information for both users may be provided by their respective separate remote devices 10A and 10B, and/or they provided by or via a server administering login processes and/or optionally administering routing between host device 10 and the separate devices 10A and 10B. In this case, the optionally the server may be part of the same server system comprising the host entertainment device 10.

In the case of FIG. 3B, it will be appreciated that optionally the two or more spoken language audios may be played in conjunction with non-language audio (such as music and/or sound effects) that can be common to some or all players. Accordingly, optionally the game or helper app affects the audio mixing pipeline. An example of such an audio mixing pipeline is found with the PlayStation 5 ® Tempest audio engine.

The pipeline may prepare common elements of the audio once, and optionally any user-specific non-language audio separately (for example where audio effects such as echoes are dependent upon the player's in-game position, or different players want different volume levels or other personalisations for their own headphones, if worn), and also prepare the language audio separately for respective users.

The audio engine then generates personalised audio for respective users by mixing the language (and optionally non-language) user-specific elements with respective copies of the common elements to create respective user's audio.

Optionally in the case of remote server based devices (e.g. cloud hosted systems such as in FIG. 2C), the audio may be sent unmixed (for example sending common elements only once) and then be mixed by the client, to reduce streaming bandwidth.

Hence in this way, a modified version of the local co-op game can provide respective audio to two or more players in their preferred languages.

Unfortunately however for some games it may not be possible to modify them in this manner. For example they may be legacy games for which source code is no longer readily accessible, making functional modification of the game difficult. Alternatively or in addition, it may simply be costly or impractical to make this modification for a large back catalogue of games.

Figure 3C:
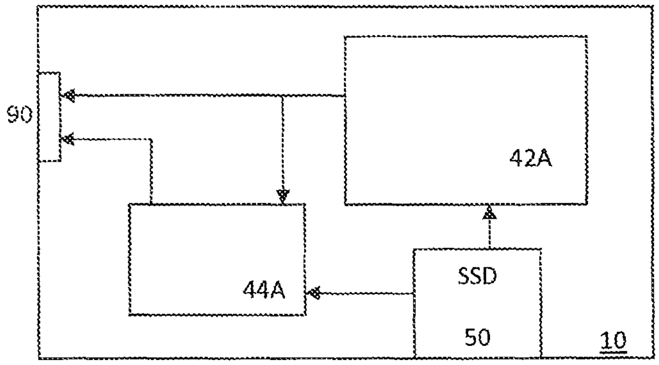

Accordingly, turning now to FIG. 3C, in an embodiment of the present invention the original and unmodified local co-op game 42A operates as originally shown in FIG. 3A, outputting audio in a single language (for example of the preferred language of player one, or whichever user first logged into the current session of entertainment device 10, or based on whatever scheme is already coded in the game).

Hence as before as the game executes it requests audio files as needed for the single language from storage device SSD 50 or similar.

However, in this case the entertainment device also hosts a helper app 44A. This helper app in effect is a stand-alone version of the helper function 44B.

Rather than modifying the game itself, or intercepting or tapping audio file requests within the game, the separate helper app can monitor file accesses from the storage device. When an audio file for the default language being used by the game is accessed, the corresponding audio file for the second (and optionally third, fourth, etc.) languages of other players can be accessed by the helper app.

The helper app can the output the corresponding audio in parallel with the audio from the game in a similar manner to the arrangement in FIG. 3B. In this case, the help app may user any suitable means to approximately synchronise the language audio.

In one instance, if the audio is being streamed from the storage device, then synchronisation can be achieved by starting to stream at substantially the same time, or accessing a similar position within the stream to that being read for the default language.

In another instance, where the audio file for the default language is being stored in RAM and used in response to game events, the helper app can also store the corresponding language files in RAM and use them in parallel; in this case the helper app may use software hooks or system interrupts to detect access to the audio files, or have system assistance or permission to monitor access to the RAM address holding the file.

In another instance, an audio output buffer may be monitored. The buffer holds audio data prior to either digital to analog conversion, or packetisation, for output from the entertainment device. The helper app can compare the audio data with the data stored on the SSD to detect when a given piece of audio data from the SSD is being used, and then inject one or more parallel audio data streams to be sent to the or each other user.

To help with tracking audio files, either when accessed from storage, accessed from RAM, or output to an audio buffer, the helper app may be configured to access a configuration file for the particular game title that tells it which audio files for language A correspond with audio files for languages B, C, D, etc., to the extent that audio filed for these languages exist.

Optionally, the helper app may be further equipped to apply a typically undetectable audio watermark to the audio files. For example it may encoding an identifier for an audio file, and optionally also a time stamp or counter, as a binary code in the lowest significant bit (LSB) of the audio data stream, optionally only for every Nth LSB as the bit rate of the audio version the bit rate required for identification may mean that relatively few bits need encoding in this manner. This will have a small impact on audio quality whilst making tracking of the audio data in the absence of other more direct monitoring mechanisms easier, by using template matching or pattern correlation or the like within relevant data streams input to, used by, or output from the game.

In this case, if the audio output by the game is mixed to include language and non-language audio, then for the additional language audio version the audio output by the game can be muted or reduced in volume so that the two languages do not clash. Alternatively, the helper app can also access the language files used in the games audio output, and use these to substantially subtract the first language audio from the output audio before adding the second language audio.

Hence using any one of the above embodiments, the entertainment device takes a single instance of a videogame that conventionally outputs audio for a single language of a first player, and outputs corresponding audio for one or more other languages of choice by one or more other players.

The respective audio can be output by the entertainment device to respective audio streams associated with the entertainment device and a secondary device (as in the arrangement of FIG. 2B) or output to two secondary devices (as in the arrangement of FIG. 2C).

This may be achieved by a helper function 44B that modifies the game to access, use, and output multiple language files in parallel rather than files for one language (as in the arrangement of FIG. 3B), or such a helper function may be a standalone app 44A (as in the arrangement of FIG. 3C) that tracks the functioning of the game to output additional audio in parallel with the single language audio output by the game.

This tracking can be based on analysis of the state of the game software, analysis of access to audio files in storage or in RAM, analysis of audio data being output by the game software for playback, or any suitable combination of these. The tracking can optionally be further facilitated by configuration data for a given game title that identifies corresponding language audio files, and/or by watermarking the audio in the files in an audibly undetectable (or inoffensive) manner.

Figure 4:
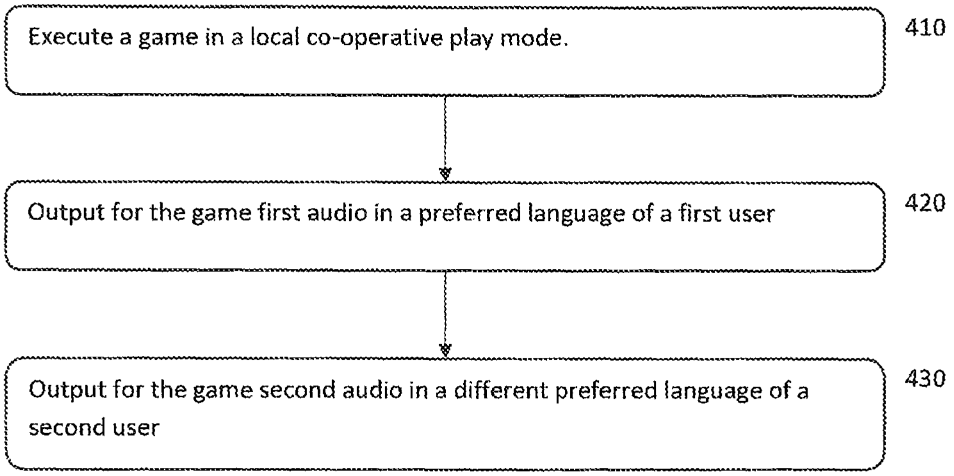
FIG. 4 is a flow diagram of a method of audio provision in accordance with embodiments of the present description.

Hence referring now to FIG. 4, in a summary embodiment of the present description, a method of audio provision, comprising the following steps.

In a first step 410, executing a game in a local co-operative play mode; as described elsewhere herein, a notable feature of such a mode is that it assumes that everyone playing is in the same place and sharing the same audio (and by extension, the same language of audio).

In a second step 420, outputting for the game first audio in a preferred language of a first user, as described elsewhere herein.

And also in a third step 430, outputting for the game second audio in a different preferred language of a second user, as described elsewhere herein. It will be appreciated that outputting audio in two languages substantially simultaneously for one instance of a game running in a local co-op mode is contrary to the normal functioning of a local co-op mode game, but recognises that new arrangements where some or all of the 'local' players are in fact remote from the host entertainment device are possible, either with the game being explicitly modified to accommodate these, or the operating system of the host entertainment device placing a legacy game within a legacy operating environment and monitoring/intercepting its activities to in order route separate or duplicate outputs to remote players.

It will be apparent to a person skilled in the art that variations in the above method corresponding to operation of the various embodiments of the apparatus as described and claimed herein are considered within the scope of the present invention, including but not limited to that:

- In an instance of the summary embodiment, the step of executing the game in a local co-operative play mode comprises executing a modified version of the game, the modified version configured to access corresponding second audio data for the second language when accessing selected first audio data for the first language; and output the corresponding second audio data for the second language when outputting selected first audio data for the first language, the outputs being directed to respective audio playback systems for the first and second users, as described elsewhere herein;
- In an instance of the summary embodiment, the method comprises executing a helper application in conjunction with the game, the helper application being configured to monitor what selected first audio data for the first language is being used by the game, access corresponding second audio data for the second language in response to which selected first audio is being used, and output the corresponding second audio data for the second language when the game outputs the selected first audio, as described elsewhere herein;
- In this instance, optionally the monitoring step comprises monitoring which first audio data for the first language is accessed by the game from a storage means, as described elsewhere herein;

In this instance, optionally the monitoring step comprises monitoring which first audio data for the first language is being accessed by the game in memory, as described elsewhere herein;

In this instance, optionally the monitoring step comprises monitoring which first audio data for the first language is being output by the game to an output buffer, as described elsewhere herein;

In this latter case, optionally the first audio data is identified by comparing the output first audio data with first audio data filed in a storage means, as described elsewhere herein;

In this instance, optionally the method comprises the step of encoding corresponding identifiers for the first audio data and second audio data within the first audio data and second audio data, as described elsewhere herein; and In an instance of the summary embodiment, the method comprises the step of providing a configuration file for the game that identifies the correspondence between the first audio data and the second audio data, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, referring again to FIGS. 1 to 3, in a summary embodiment of the description an audio provision system (such as entertainment device 10, either in a domestic, developer, server, or virtualised setting) comprises a game execution processor (for example CPU 20) configured (for example by suitable software instruction) to execute a game in a local co-operative play mode, an audio output processor (for example CPU 20 and/or GPU 30) configured (for example by suitable software instruction originating as appropriate from one or more of the operating system, the game, or a helper app) to output for the game first audio in a preferred language of a first user, and wherein the audio output processor is also configured to output for the game second audio in a different preferred language of a second user, as all described elsewhere herein.

Instances of this summary embodiment implementing the methods and techniques described herein (for example by use of suitable software instruction) are envisaged within the scope of the application, including but not limited to that:

In an instance of the summary embodiment, the game execution processor is configured to execute a modified version of the game, the modified version being configured to access corresponding second audio data for the second language when accessing selected first audio data for the first language, and output using the audio output processor the corresponding second audio data for the second language when outputting selected first audio data for the first language, the outputs being directed to respective audio playback systems for the first and second users, as described elsewhere herein;

In an instance of the summary embodiment, the game execution processor is configured to execute a helper application in conjunction with the game, the helper application being configured to monitor what selected first audio data for the first language is being used by the game, access corresponding second audio data for the second language in response to which selected first audio is being used, and output using the audio output processor the corresponding second audio data for the second language when the game outputs the selected first audio, as described elsewhere herein;

In this instance, optionally the helper app is configured to monitor what selected first audio data for the first language is being used by the game by one or more selected from the list consisting of monitoring which first audio data for the first language is accessed by the game from a storage means, monitoring which first audio data for the first language is being accessed by the game in memory, and monitoring which first audio data for the first language is being output by the game to an output buffer, as described elsewhere herein; and In an instance of the summary embodiment, the game execution processor is configured to access a configuration file provided for the game that identifies the correspondence between the first audio data and the second audio data, as described elsewhere herein.

It will also be appreciated that the audio provision system, comprising the entertainment device, may also comprise a wider ecosystem operating cooperatively to output the respective audio to the respective users.

Accordingly, an audio provision ecosystem comprises the audio provision system as described and claimed herein, and optionally also one or more selected from the list consisting of a server administering a real or virtual instance of the audio provision system configured to route audio data (and typically other data) to two or more recipients; and one or more remote separate devices configured to receive the respective audio data (and typically other data) and output it for the user of that device to hear.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of audio provision, comprising the steps of:

executing a game in a local co-operative play mode;

outputting for the game first audio in a preferred language of a first user;

outputting for the game second audio in a different preferred language of a second user; and executing a helper application in conjunction with the game, the helper application being configured to:

monitor what selected first audio data for the first language is being used by the game, access corresponding second audio data for the second language in response to which selected first audio is being used, and output the corresponding second audio data for the second language when the game outputs the selected first audio.

2. The method of claim 1, wherein executing the game in a local co-operative play mode comprises executing a modified version of the game, the modified version configured to:

access corresponding second audio data for the second language when accessing selected first audio data for the first language; and output the corresponding second audio data for the second language when outputting selected first audio data for the first language, the outputs being directed to respective audio playback systems for the first and second users.

3. The method of claim 1, wherein monitoring comprises: monitoring which first audio data for the first language is accessed by the game from a storage means.

4. The method of claim 1, wherein monitoring comprises: monitoring which first audio data for the first language is being accessed by the game in memory.

5. The method of claim 1, wherein monitoring comprises: monitoring which first audio data for the first language is being output by the game to an output buffer.

6. The method of claim 5, wherein the first audio data is identified by comparing the output first audio data with first audio data filed in a storage means.

7. The method of claim 1, further comprising:

encoding corresponding identifiers for the first audio data and second audio data within the first audio data and second audio data.

8. The method of claim 1, further comprising: providing a configuration file for the game that identifies the correspondence between the first audio data and the second audio data.

9. A non-transitory, computer-readable storage medium storing a computer program comprising computer executable instructions, which when executed by a computer system, cause the computer system to perform a method, comprising:

executing a game in a local co-operative play mode;

outputting for the game first audio in a preferred language of a first user; outputting for the game second audio in a different preferred language of a second user, and executing a helper application in conjunction with the game, the helper application being configured to:

monitor what selected first audio data for the first language is being used by the game, access corresponding second audio data for the second language in response to which selected first audio is being used, and output the corresponding second audio data for the second language when the game outputs the selected first audio.

10. An audio provision system, comprising:

a game execution processor configured to execute a game in a local co-operative play mode; and an audio output processor, wherein the game execution processor is configured to execute a helper application in conjunction with the game, the helper application being configured to:

monitor what selected first audio data for the first language is being used by the game;

access corresponding second audio data for the second language in response to which selected first audio is being used; and output using the audio output processor the corresponding second audio data for the second language when the game outputs the selected first audio, and wherein the audio output processor is configured to output, for the game, first audio in a preferred language of a first user and second audio in a different preferred language of a second user.

11. The audio provision system of claim 10, wherein the game execution processor is configured to execute a modified version of the game, the modified version being configured to:

access corresponding second audio data for the second language when accessing selected first audio data for the first language; and output using the audio output processor the corresponding second audio data for the second language when outputting selected first audio data for the first language, the outputs being directed to respective audio playback systems for the first and second users.

12. The audio provision system of claim 10, wherein the helper app is configured to monitor what selected first audio data for the first language is being used by the game by one or more of:

i. monitoring which first audio data for the first language is accessed by the game from a storage means;

ii. monitoring which first audio data for the first language is being accessed by the game in memory; and iii. monitoring which first audio data for the first language is being output by the game to an output buffer.

13. The audio provision system of claim 10, wherein the game execution processor is configured to access a configuration file provided for the game that identifies the correspondence between the first audio data and the second audio data.

* * * * *